(12) United States Patent
Sato et al.

(10) Patent No.: US 10,304,627 B2
(45) Date of Patent: May 28, 2019

(54) MULTILAYER CERAMIC CAPACITOR

(71) Applicant: TAIYO YUDEN CO., LTD., Chuo-ku, Tokyo (JP)

(72) Inventors: So Sato, Takasaki (JP); Yoshiaki Iijima, Takasaki (JP); Takashi Sasaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 64 days.

(21) Appl. No.: 15/697,983

(22) Filed: Sep. 7, 2017

(65) Prior Publication Data

US 2018/0075970 A1 Mar. 15, 2018

(30) Foreign Application Priority Data

Sep. 14, 2016 (JP) .................................. 2016-179228

(51) Int. Cl.
| | |
|---|---|
| *H01G 4/12* | (2006.01) |
| *H01G 4/30* | (2006.01) |
| *H01G 4/232* | (2006.01) |
| *H01G 4/33* | (2006.01) |
| *H01G 4/005* | (2006.01) |
| *H01G 4/224* | (2006.01) |

(52) U.S. Cl.
CPC .............. *H01G 4/12* (2013.01); *H01G 4/005* (2013.01); *H01G 4/224* (2013.01); *H01G 4/232* (2013.01); *H01G 4/30* (2013.01); *H01G 4/33* (2013.01)

(58) Field of Classification Search
CPC ............ H01G 4/12; H01G 4/30; H01G 4/228; H01G 4/232; H01G 4/2325
See application file for complete search history.

(56) References Cited

U.S. PATENT DOCUMENTS

| | | | | |
|---|---|---|---|---|
| 2011/0309718 | A1* | 12/2011 | Ogawa | ...................... H01C 1/14 310/311 |
| 2014/0085767 | A1* | 3/2014 | Kang | ....................... H01G 4/12 361/301.4 |
| 2016/0024346 | A1* | 1/2016 | Inoue | ................... C09D 163/00 361/301.4 |
| 2016/0233027 | A1* | 8/2016 | Iijima | ..................... H01G 4/30 |

FOREIGN PATENT DOCUMENTS

JP S61025234 U 2/1986

* cited by examiner

*Primary Examiner* — Eric W Thomas
(74) *Attorney, Agent, or Firm* — Law Office of Katsuhiro Arai

(57) ABSTRACT

In an embodiment, a multilayer ceramic capacitor 10 is such that: the two first base conductor films 11c, and the supplementary dielectric layer 11d, on each of both height-direction faces of the capacitive element 11', are connected to each other based on mutual bonding of the dielectric particles contained in each of them; the two first base conductor films 11c on each of both height-direction faces of the capacitive element 11', and the capacitive element 11', are connected to each other based on mutual bonding of the dielectric particles contained in each of them; and the supplementary dielectric layer 11d on each of both height-direction faces of the capacitive element 11', are the capacitive element 11', are connected to each other based on mutual bonding of the dielectric particles contained in each of them.

6 Claims, 6 Drawing Sheets

MULTILAYER CERAMIC CAPACITOR

BACKGROUND

Field of the Invention

The present invention relates to a multilayer ceramic capacitor whose external electrodes have wrap-around parts where they wrap around onto at least one height-direction face of the capacitor body.

Description of the Related Art

A multilayer ceramic capacitor whose size is specified by its length, width, and height generally comprises a capacitor body of roughly rectangular solid shape which has a capacitive part constituted by multiple internal electrode layers stacked together with dielectric layers in between, as well as a pair of external electrodes which are provided on both length-direction ends of the capacitor body and to which the multiple internal electrode layers are connected alternately. Also, each external electrode has wrap-around parts where it wraps around onto at least one height-direction face of the capacitor body.

When a multilayer ceramic capacitor is mounted on a circuit board, its capacitor body may generate cracks due to the forces received from the component mounter, etc., when the multilayer ceramic capacitor is mounted on the circuit board, or due to the forces received from the circuit board, etc., after the multilayer ceramic capacitor has been mounted on the circuit board. This generation of cracks is associated with the strength of the capacitor body, so normally when the capacitor body has a smaller height and is therefore more subject to lack of strength, the likelihood of cracks generating also increases.

Among the methods that can be used to compensate for the lack of strength of the capacitor body even when it has a smaller height, is a method whereby dielectric layers are provided between two wrap-around parts on the face of the capacitor body onto which each external electrode wraps around, as shown in FIGS. 4 and 5 in Patent Literature 1 mentioned below.

When this method is used, however, gaps between the dielectric layers and the two wrap-around parts (refer to FIG. 4 in Patent Literature 1 mentioned below) make it difficult to compensate for the lack of strength of the capacitor body where the gaps are present, and therefore it is desirable to eliminate any gaps between the two wrap-around parts and the dielectric layers (refer to FIG. 5 in Patent Literature 1 mentioned below). Also, dielectric layers that are thicker than the two wrap-around parts become obstructions when mounting the multilayer ceramic capacitor onto a circuit board (refer to FIGS. 4 and 5 in Patent Literature 1 mentioned below), so it is desirable to set the dielectric layers as thick as, or less thick than, the two wrap-around parts.

Even when there are no gaps between the two wrap-around parts and the dielectric layers, however, it is practically difficult to compensate for the lack of strength of the capacitor body if the two wrap-around parts are only contacting the dielectric layers. To be specific, even when the two wrap-around parts are contacting the dielectric layers with no gaps in between, applying a force to the multilayer ceramic capacitor that would cause the capacitor body to warp in the height direction causes the locations where the two wrap-around parts are contacting the dielectric layers to open, and therefore create gaps that continue to the capacitor body, and consequently problems similar to those caused by the aforementioned gaps occur.

BACKGROUND ART LITERATURES

[Patent Literature 1] Japanese Utility Model Laid-open No. Sho 61-025234

SUMMARY

An object of the present invention is to provide a multilayer ceramic capacitor that, even when a dielectric layer is provided between two wrap-around parts on the face of the capacitor body onto which each external electrode wraps around, allows the lack of strength of the capacitor body to be compensated for in a reliable manner by the dielectric layer.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor pertaining to the present invention is a multilayer ceramic capacitor comprising a capacitor body of roughly rectangular solid shape, as well as a pair of external electrodes provided on both length-direction ends of the capacitor body, with the external electrodes each having wrap-around parts where it wraps around at least onto one height-direction face of the capacitor body: wherein the capacitor body has: (a1) a capacitive element of roughly rectangular solid shape which has a capacitive part constituted by multiple internal electrode layers stacked together with dielectric layers in between; (a2) first base conductor films provided on both length-direction ends of at least one height-direction face of the capacitive element; and (a3) a supplementary dielectric layer provided between the two first base conductor films on at least one height-direction face of the capacitive element; where (a4) the two first base conductor films, and the supplementary dielectric layer, on at least one height-direction face of the capacitive element, are connected to each other based on mutual bonding of the dielectric particles contained in each of them; (a5) the two first base conductor films on at least one height-direction face of the capacitive element, and the capacitive element, are connected to each other based on mutual bonding of the dielectric particles contained in each of them; and (a6) the supplementary dielectric layer on at least one height-direction face of the capacitive element, and the capacitive element, are connected to each other based on mutual bonding of the dielectric particles contained in each of them; wherein one of the external electrodes has: (b1) a second base conductor film attached to one length-direction face of the capacitive element, and also to one length-direction edges of the first base conductor films present on one length-direction side of the capacitor body; and (b2) a surface conductor film continuously attached to the surface of the second base conductor film and to the surfaces of the first base conductor films; where (b3) the first base conductor films, and wrap-around locations of the surface conductor film where it is attached to the first base conductor films, together constitute the wrap-around parts; and wherein the other of the external electrodes has: (c1) a second base conductor film attached to the other length-direction face of the capacitive element, and also to the other length-direction edges of the first base conductor films present on the other length-direction side of the capacitor body; and (c2) a surface conductor film continuously attached to the surface of the second base conductor film and to the surfaces of the first base conductor films; where (c3) the first base conductor films, and wrap-around locations of the surface conductor film where it is attached to the first base conductor films, together constitute the wrap-around parts.

According to the multilayer ceramic capacitor pertaining to the present invention, a multilayer ceramic capacitor can be provided that, even when a dielectric layer is provided between two wrap-around parts on the face of the capacitor body onto which each external electrode wraps around, allows the lack of strength of the capacitor body to be compensated for in a reliable manner by the dielectric layer.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

10—Multilayer ceramic capacitor, 11—Capacitor body, 11'—Capacitive element, 11a—Capacitive part, 11a1—Internal electrode layer, 11a2—Dielectric layer, 11b—Dielectric margin part, 11c—First base conductor film, 11d—Supplementary dielectric layer, 12—First external electrode, 12a—Second base conductor film, 12b—Surface conductor film, 12b1—Wrap-around location of the surface conductor film, 12c—Wrap-around part of the first external electrode, 13—Second external electrode, 13a—Second base conductor film, 13b—Surface conductor film, 13b1—Wrap-around location of the surface conductor film, 13c—Wrap-around part of the second external electrode.

DETAILED DESCRIPTION OF EMBODIMENTS

Figure 1:
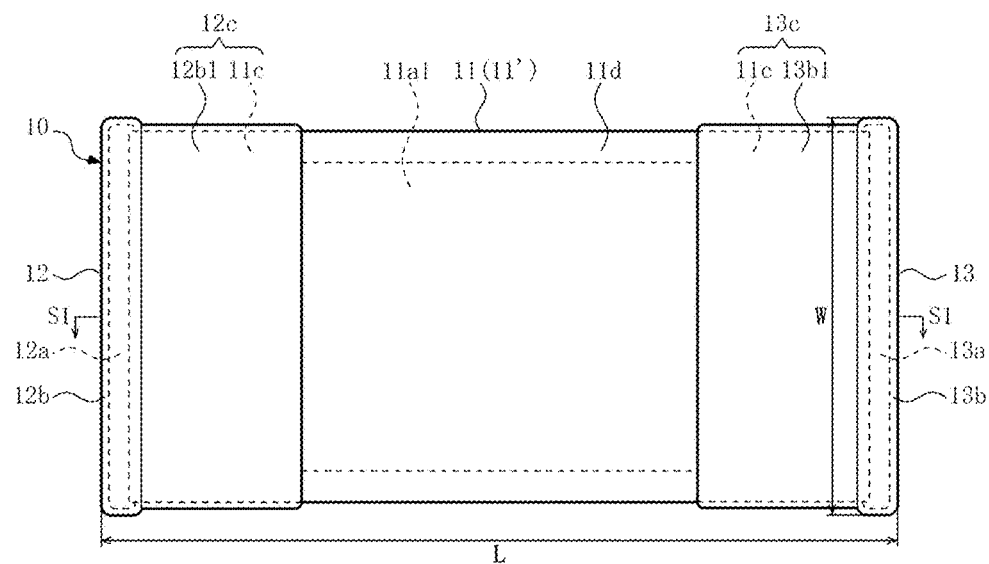
FIG. 1 is a drawing of a multilayer ceramic capacitor to which the present invention is applied, viewed from one height-direction face side.
Figure 2:
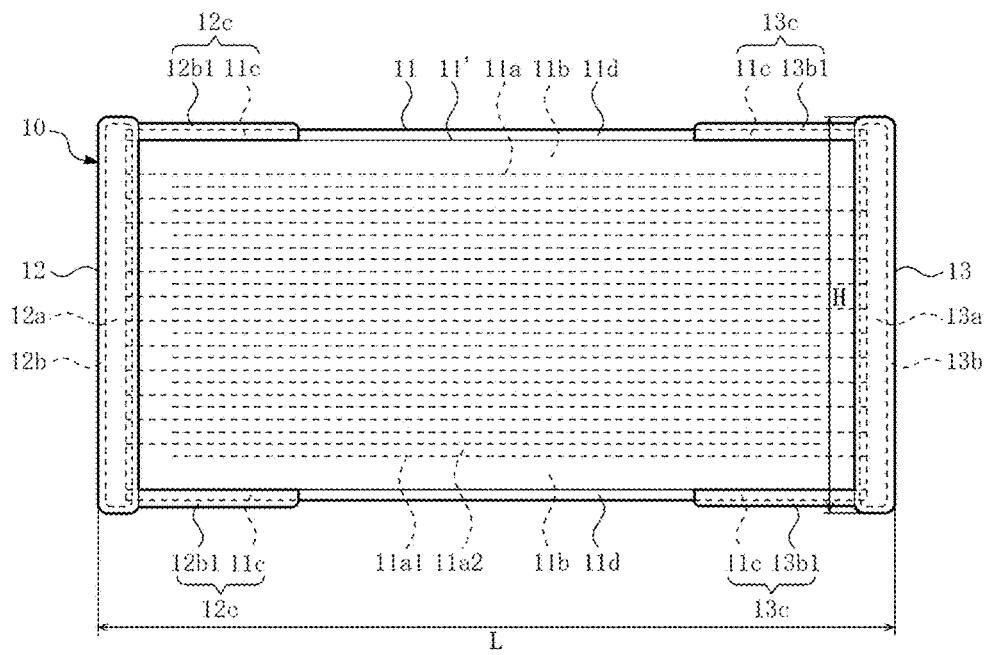
FIG. 2 is a drawing of the multilayer ceramic capacitor shown in FIG. 1, viewed from one width-direction face side.

First, the structure of a multilayer ceramic capacitor 10 to which the present invention is applied, is explained using FIGS. 1 to 4. In the explanation below, the lateral direction in FIG. 1 is referred to as "length direction," the vertical direction in FIG. 1 is referred to as "width direction," and the vertical direction in FIG. 2 is referred to as "height direction," while the dimensions along these length direction, width direction, and height direction are referred to as "length," "width" and "height," respectively.

The size of the multilayer ceramic capacitor shown in FIGS. 1 to 4 is specified by its length L, width W, and height H. For reference, the actual dimensions of length L, width W, and height H of the prototype on which FIGS. 1 to 4 are based, are 600 µm, 300 µm, and 300 µm, respectively, where the relationship of "Length L>Width W=Height H" holds. This multilayer ceramic capacitor 10 comprises a capacitor body 11 of roughly rectangular solid shape, a first external electrode 12 provided on one length-direction end (left end in FIGS. 1 to 3) of the capacitor body 11, and a second external electrode 13 provided on the other length-direction end (right end in FIGS. 1 to 3) of the capacitor body 11.

Figure 3:
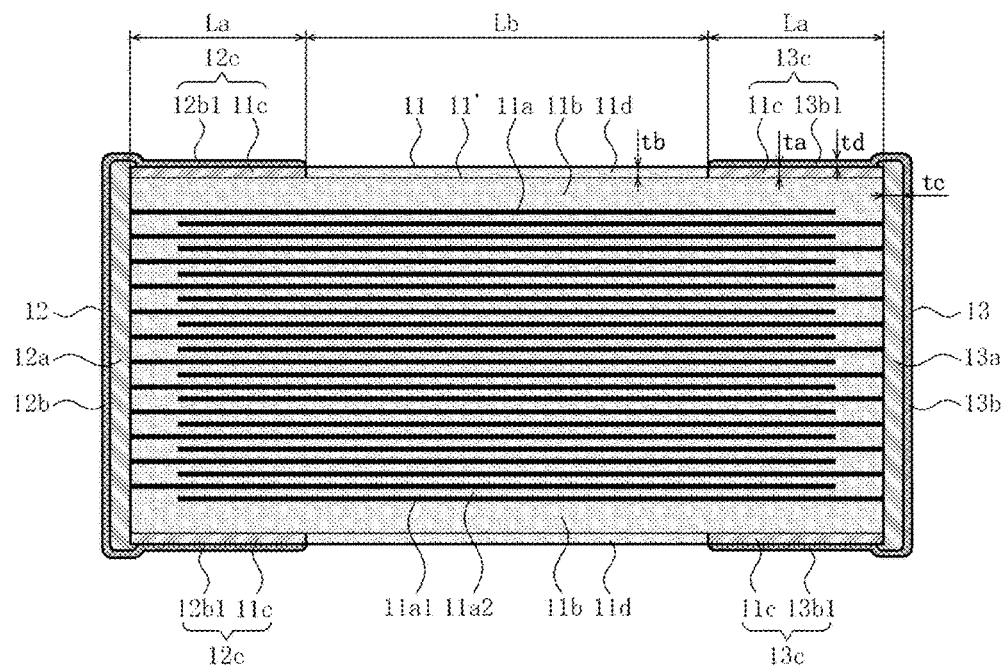
FIG. 3 is a cross-sectional view of the multilayer ceramic capacitor shown in FIG. 1 along line S1-S1.

The capacitor body 11 has: (a1) a capacitive element 11' of roughly rectangular solid shape which has a capacitive part 11a constituted by multiple internal electrode layers 11a1 stacked together with dielectric layers 11a2 in between, and dielectric margin parts 11b provided on both height-direction ends of the capacitive part 11a; (a2) (total four) first base conductor films 11c provided on both length-direction ends of both height-direction faces of the capacitive element 11'; and (a3) (total two) supplementary dielectric layers 11d provided between the two first base conductor films 11c on each of both height-direction faces of the capacitive element 11'; where (a4) the two first base conductor films 11c, and the supplementary dielectric layer 11d, on each of both height-direction faces of the capacitive element 11', are connected to each other based on mutual bonding of the dielectric particles DP (refer to FIG. 4) contained in each of them; (a5) the two first base conductor films 11c on each of both height-direction faces of the capacitive element 11', and the capacitive element 11', are connected to each other based on mutual bonding of the dielectric particles contained in each of them; and (a6) the supplementary dielectric layer 11d on each of both height-direction faces of the capacitive element 11', and the capacitive element 11', are connected to each other based on mutual bonding of the dielectric particles contained in each of them. It should be noted that, while a total of 24 internal electrode layers 11a1 are depicted in FIGS. 2 and 3 for the purpose of illustration, the number of internal electrode layers 11a1 is not limited in any way.

Each internal electrode layer 11a1 has roughly the same external shape (roughly rectangular shape) and roughly the same thickness. The length (not accompanied by symbol) of each internal electrode layer 11a1 is smaller than the length (not accompanied by symbol) of the capacitive element 11', while the width (not accompanied by symbol) of each internal electrode layer 11a1 is smaller than the width (not accompanied by symbol) of the capacitive element 11'. The thickness of each internal electrode layer 11a1 is set in a range of 0.5 to 3 μm, for example.

Each dielectric layer 11a2 has roughly the same external shape (roughly rectangular shape) and roughly the same thickness. The length (not accompanied by symbol) of each dielectric layer 11a2 is roughly the same as the length (not accompanied by symbol) of the capacitive element 11', while the width (not accompanied by symbol) of each dielectric layer 11a2 is roughly the same as the width (not accompanied by symbol) of the capacitive element 11'. The thickness of each dielectric layer 11a2 is set in a range of 0.5 to 3 μm, for example.

Each dielectric margin part 11b has roughly the same external shape (roughly rectangular shape) and roughly the same thickness. The length (not accompanied by symbol) of each dielectric margin part 11b is roughly the same as the length (not accompanied by symbol) of the capacitive element 11', while the width (not accompanied by symbol) of each dielectric margin part 11b is roughly the same as the width (not accompanied by symbol) of the capacitive element 11'. The thickness of each dielectric margin part 11b is set in a range of 5 to 30 μm, for example.

The primary component of each internal electrode layer 11a1 is nickel, copper, palladium, platinum, silver, gold, alloy thereof, or other metal material, for example. The primary component of each dielectric layer 11a2 and that of each dielectric margin part 11b, or specifically the primary component of the capacitive element 11' except for the internal electrode layers 11a1, are both barium titanate, strontium titanate, calcium titanate, magnesium titanate, calcium zirconate, calcium zirconate titanate, barium zirconate, titanium oxide, or other dielectric material (dielectric ceramic material), for example.

Each first base conductor film 11c has roughly the same external shape (roughly rectangular shape) and roughly the same thickness. The length La of each first base conductor film 11c is set in a range of one-sixth to three-sevenths the length L of the multilayer ceramic capacitor 10, for example, while the width (not accompanied by symbol) of each first base conductor film 11c is roughly the same as the width (not accompanied by symbol) of the capacitive element 11'. The thickness to of each first base conductor film 11c is set in a range of 2 to 6 μm, for example.

The first primary component of each first base conductor film 11c is nickel, copper, palladium, platinum, silver, gold, alloy thereof, or other metal material, for example, or preferably the same metal material as the primary component of each internal electrode layer 11a1. Each first base conductor film 11c also contains, as the second primary component, barium titanate, strontium titanate, calcium titanate, magnesium titanate, calcium zirconate, calcium zirconate titanate, barium zirconate, titanium oxide, or other dielectric material (dielectric ceramic material), for example, or preferably the same dielectric material as the primary component of each supplementary dielectric layer 11d. The weight ratio of the second primary component, to the first primary component, in each first base conductor film 11c (second primary component/first primary component), is set in a range of one-eighth to three-eighths, for example.

Each supplementary dielectric layer 11d has roughly the same external shape (roughly rectangular shape) and roughly the same thickness. The length Lb of each supplementary dielectric layer 11d roughly corresponds to the value calculated by subtracting twice the length La of the first base conductor film 11c from the length (not accompanied by symbol) of the capacitive element 11', while the width (not accompanied by symbol) of each supplementary dielectric layer 11d is roughly the same as the width (not accompanied by symbol) of the capacitive element 11'. The thickness tb of each supplementary dielectric layer 11d is set in a range of 2 to 6 μm, for example, or preferably it is roughly the same as the thickness to of the first base conductor film 11c.

The primary component of each supplementary dielectric layer 11d is barium titanate, strontium titanate, calcium titanate, magnesium titanate, calcium zirconate, calcium zirconate titanate, barium zirconate, titanium oxide, or other dielectric material (dielectric ceramic material), for example, or preferably the same dielectric material as the primary component of the capacitive element 11' except for the internal electrode layers 11a1.

Figure 4:
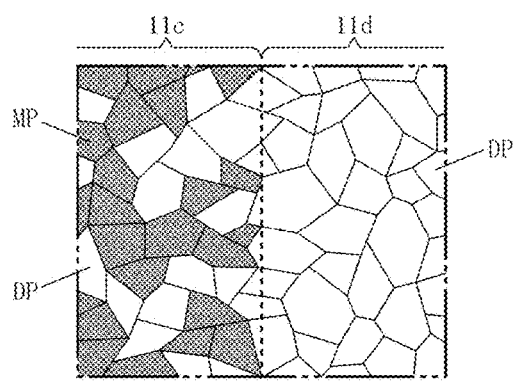
FIG. 4 is a drawing illustrating the condition of bonding between the first base conductor film and supplementary dielectric layer shown in FIG. 3.

Now, FIG. 4 is used to provide supplemental explanation of the condition of bonding between the first base conductor film 11c and the supplementary dielectric layer 11d as described in (a4) above, and also provide supplemental explanation of the condition of bonding between the first base conductor film 11c and the capacitive element 11' as described in (a5) above, and the condition of bonding between the supplementary dielectric layer 11d and the capacitive element 11' as described in (a6) above.

<Condition of Bonding Between the First Base Conductor Film 11c and the Supplementary Dielectric Layer 11d>

FIG. 4 is a drawing illustrating the condition of bonding between the first base conductor film 11c and the supplementary dielectric layer 11d, which was drawn based on an image of key parts of a prototype as obtained by an electron microscope.

The first base conductor film 11c is a sintered body constituted by a metal material as its first primary component and a dielectric material as its second primary component, so it has many metal particles MP and many dielectric particles DP bonded together in irregular arrangements, as shown in FIG. 4, and also has conductivity due to the many metal particles MP mutually bonded. On the other hand, the supplementary dielectric layer 11d is a sintered body constituted by a dielectric material as its primary component, so it has many dielectric particles DP bonded together in irregular arrangements, as shown in FIG. 4.

When the dielectric material contained in the first base conductor film 11c is the same composition as the dielectric material contained in the supplementary dielectric layer 11d (both dielectric materials consist of the same composition or material), or when both dielectric materials consist essentially of or comprise the same composition or material, or when both dielectric materials consist of, consist essentially of, or comprise a different composition that consists of, consists essentially of, or comprises the same element(s), then by sintering, sintering-based particle bonding is achieved in a condition where, at the boundary between the first base conductor film 11c and the supplementary dielectric layer 11d (refer to the broken line in FIG. 4), the dielectric particles DP in the first base conductor film 11c have partially entered the supplementary dielectric layer 11d while the dielectric particles DP in the supplementary dielectric layer 11d have partially entered the first base conductor film 11c, or specifically in a condition where the dielectric particles DP contained in the first base conductor film 11c and those contained in the supplementary dielectric layer 11d are inter-mixed and mutually bonded at the boundary, and the first base conductor film 11c and the supplementary conductor layer 11d are strongly connected to each other under close contact based on this mutual bonding of dielectric particles DP. In this disclosure, the "mutual bonding" refers to mutual adhesion beyond physical contact in a manner which is substantially similar to or the same as that in which dielectric particles within the first base conductor layer and supplementary dielectric layer are mutually bonded or adhered by, e.g., sintering where there is substantially no apparent boundary between the first base conductor layer and the supplementary dielectric layer at the boundary with respect to bonding between dielectric particles.

<Condition of Connection Between the First Base Conductor Film 11c and the Capacitive Element 11'>

The part of the capacitive element 11' except for the internal electrode layers 11a1 is a sintered body constituted by a dielectric material as its primary component, so it also has many dielectric particles DP bonded together in irregular arrangements, in the same manner as shown in the right part of FIG. 4. When the dielectric material contained in the first base conductor film 11c is the same composition as the dielectric material contained in the capacitive element 11' (both dielectric materials consist of the same composition or material), or when both dielectric materials consist essentially of or comprise the same composition or material, or when both dielectric materials consist of, consist essentially of, or comprise a different composition that consists of, consists essentially of, or comprises the same element(s), then by sintering, sintering-based particle bonding is achieved in a condition where, at the boundary between the first base conductor film 11c and the capacitive element 11', the dielectric particles in the first base conductor film 11c have partially entered the capacitive element 11' while the dielectric particles in the capacitive element 11' have partially entered the first base conductor film 11c, or specifically in a condition where the dielectric particles contained in the first base conductor film 11c and those contained in the capacitive element 11' are inter-mixed and mutually bonded at the boundary, in the same manner as shown in FIG. 4, and the first base conductor film 11c and the capacitive element 11' are strongly connected to each other under close contact based on this mutual bonding of dielectric particles.

<Condition of Connection Between the Supplementary Dielectric Layer 11d and the Capacitive Element 11'>

The part of the capacitive element 11' except for the internal electrode layers 11a1 is a sintered body constituted by a dielectric material as its primary component, so it also has many dielectric particles DP bonded together in irregular arrangements, in the same manner as shown in the right part of FIG. 4. When the dielectric material contained in the supplementary dielectric layer 11d is the same composition as the dielectric material contained in the capacitive element 11' (both dielectric materials consist of the same composition or material), or when both dielectric materials consist essentially of or comprise the same composition or material, or when both dielectric materials consist of, consist essentially of, or comprise a different composition that consists of, consists essentially of, or comprises the same element(s), then by sintering, sintering-based particle bonding is achieved in a condition where, at the boundary between the supplementary dielectric layer 11d and the capacitive element 11', the dielectric particles in the supplementary dielectric layer 11d have partially entered the capacitive element 11' while the dielectric particles in the capacitive element 11' have partially entered the supplementary dielectric layer 11d, or specifically in a condition where the dielectric particles contained in the supplementary dielectric layer 11d and those contained in the capacitive element 11' are inter-mixed and mutually bonded at the boundary, and the supplementary dielectric layer 11d and the capacitive element 11' are strongly connected to each other under close contact based on this mutual bonding of dielectric particles.

The first electrode layer 12 has: (b1) a second base conductor film 12a attached to one length-direction face (left face in FIG. 3) of the capacitive element 11', and also attached to one length-direction edges (left edges in FIG. 3) of the two first base conductor films 11c present on one length-direction side (left side in FIG. 3) of the capacitor body 11; and (b2) a surface conductor film 12b continuously attached to the surface of the second base conductor film 12a and to the surfaces of the two first base conductor films 11c; where (b3) the two first base conductor films 11c, and wrap-around locations 12b1 of the surface conductor film 12b where it is attached to the respective first base conductor films 11c, together constitute two wrap-around parts 12c where they wrap around onto both height-direction faces of the capacitor body 11.

The second electrode layer 13 has: (c1) a second base conductor film 13a attached to the other length-direction face (right face in FIG. 3) of the capacitive element 11', and also attached to the other length-direction edges (right edges in FIG. 3) of the two first base conductor films 11c present on the other length-direction side (right side in FIG. 3) of the capacitor body 11; and (c2) a surface conductor film 13b continuously attached to the surface of the second base conductor film 13a and to the surfaces of the two first base conductor films 11c; where (c3) the two first base conductor films 11c, and wrap-around locations 13b1 of the surface conductor film 13b where it is attached to the respective first base conductor films 11c, together constitute two wrap-around parts 13c where they wrap around onto both height-direction faces of the capacitor body 11.

In other words, each external electrode 12 and 13 has two wrap-around parts 12c and 13c where it wraps around onto both height-direction faces of the capacitor body 11. As shown in FIG. 3, the edges of the aforementioned multiple internal electrode layers 11a1 are connected alternately to the second base conductor film 12a on the first external electrode 12 and to the second base conductor film 13a on the second external electrode 13. It should be noted that, although the second base conductor films 12a and 13a of the respective external electrodes 12 and 13, as depicted in FIGS. 1 to 3, are such that their height-direction edges are both riding slightly over the respective first base conductor films 11c, these ride-over parts are not necessary, or the lengths of the ride-over parts may be slightly larger than the lengths shown in the figure.

The thickness tc of the second base conductor film 12a and 13a of each external electrode 12 and 13 is set in a range of 5 to 15 µm, for example. The thickness td of the surface conductor film 12b and 13b of each external electrode 12 and 13 is set in a range of 2 to 6 µm, for example. Also, the length (not accompanied by symbol) of the wrap-around location 12b1 and 13b1 of the surface conductor film 12b and 13b of each external electrode 12 and 13 is roughly the same as the length La of the first base conductor film 11c.

The primary component of the second base conductor film 12a and 13a of each external electrode 12 and 13 is nickel, copper, palladium, platinum, silver, gold, alloy thereof, or other metal material, for example. Also, the primary component of the surface conductor film 12b and 13b of each external electrode 12 and 13 is copper, nickel, tin, palladium, gold, zinc, alloy thereof, or other metal material, for example.

Now, the layer structure of the surface conductor film 12b and 13b of each external electrode 12 and 13 is supplementarily explained below. For the purpose of illustration, FIG. 3 is drawn in such a way that the layer structure of the surface conductor film 12b and 13b is not identifiable; however, each surface conductor film 12b and 13b may adopt a single-layer structure constituted by one layer of film, or a multilayer structure constituted by two or more layers of films.

An example is given for the purpose of explanation. When the primary component of each external electrode layer 11a1, first primary component of each first base conductor film 11c, and primary component of each second base conductor film 12a and 13a are all nickel, a film whose primary component is tin can be used favorably if the surface conductor film 12b and 13b have a single-layer structure. Also, if the surface conductor film 12b and 13b have a two-layer structure, a combination of a first film whose primary component is nickel, and a second film whose primary component is tin, can be used favorably. Furthermore, if the surface conductor film 12b and 13b have a three-layer structure, a combination of a first film whose primary component is copper, a second film whose primary component is nickel, and a third film whose primary component is tin, can be used favorably. Needless to say, a film whose primary component is a metal material other than the above, may also be used for each film as deemed appropriate. In addition, preferably each film is a plating film, and any known wet plating method or dry plating method may be used to produce a plating film as deemed appropriate.

Next, an example of how the multilayer ceramic capacitor 10 shown in FIGS. 1 to 4 is manufactured, or specifically an example of manufacturing method when the primary component of the capacitive element 11' except for the internal electrode layers 11a1, second primary component of each first base conductor film 11c, and primary component of each supplementary dielectric layer 11d are all barium titanate, the primary component of each internal electrode layer 11a1, first primary component of each first base conductor film 11c, and primary component of each second base conductor film 12a and 13a are all nickel, and each surface conductor film 12b and 13b has a single-layer structure and is constituted by a film whose primary component is tin, is explained using FIGS. 5 to 10 as well as the symbols shown in FIGS. 1 to 4. It should be noted that the manufacturing method explained here is only an example and does not limit in any way how the aforementioned multilayer ceramic capacitor 10 is manufactured.

For the manufacturing, first a ceramic slurry containing barium titanate powder, organic solvent, organic binder, dispersant, etc., a first electrode paste containing nickel powder, organic solvent, organic binder, dispersant, etc., and a second electrode paste containing nickel powder, barium titanate powder, organic solvent, organic binder, dispersant, etc., are prepared.

Next, a method involving coating and drying the ceramic slurry is used to produce a first sheet constituted by a carrier film having a green sheet formed on its surface. Also, a method involving printing and drying the first electrode paste is used to produce a second sheet constituted by a first sheet having unsintered matrix or zigzag internal electrode layer patterns formed on the surface of the green sheet. Then, a third sheet is produced, which is constituted by a first sheet having unsintered striped first base conductor film patterns corresponding to the respective first base conductor films 11c, and unsintered striped supplementary dielectric layer patterns corresponding to the respective supplementary dielectric layers 11d, formed on the surface of the green sheet.

Figure 5:
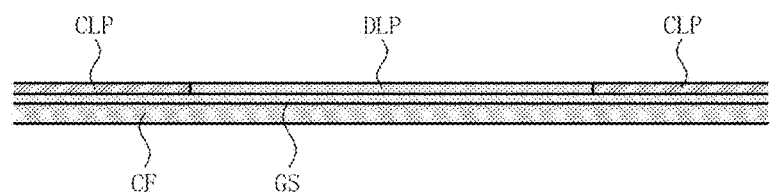
FIG. 5 is a cross-sectional view of a third sheet, offered to explain an example of how the multilayer ceramic capacitor shown in FIGS. 1 to 4 is manufactured.

Here, the constitution of the third sheet, and an example of how the third sheet is produced are supplementarily explained using FIGS. 5 and 6. It should be noted that the production method explained here is only an example and does not limit in any way how the third sheet is produced.

As shown in FIG. 5, the third sheet has a green sheet GS formed on the surface of a carrier film CF, as well as unsintered striped first base conductor film patterns CLP and unsintered striped supplementary dielectric layer patterns DLP formed on the surface of the green sheet GS. The thickness of the unsintered first base conductor film patterns CLP is roughly the same as the thickness of the unsintered supplementary dielectric layer patterns DLP. It should be noted that, while FIG. 5 depicts an unsintered first multilayer sheet corresponding to one multilayer ceramic capacitor 10, for the purpose of illustration, the actual third sheet has a size that allows multiple multilayer ceramic capacitors 10 to be taken from it.

This third sheet is produced by forming the unsintered first base conductor film patterns CLP, and then forming the unsintered supplementary dielectric layer patterns DLP. To form the unsintered first base conductor film patterns CLP, preferably a method whereby the second electrode paste is printed on the surface of the green sheet GS and then dried, can be adopted. To form the unsintered supplementary dielectric layer patterns DLP, on the other hand, preferably one of the methods shown in FIGS. 6A to 6C can be adopted as deemed appropriate.

Figure 6A:
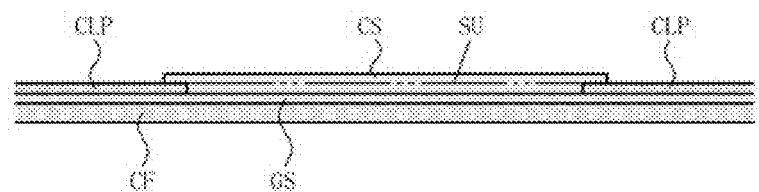
FIGS. 6A to 6C are each a drawing corresponding to FIG. 5, offered to explain an example of how the third sheet shown in FIG. 5 is manufactured.

The method shown in FIG. 6A is one whereby the ceramic slurry CS is printed between the adjacent unsintered first base conductor film patterns CLP by means of screen printing, etc., in a manner thicker than the thickness of the unsintered first base conductor film patterns CLP and also wider than the spacing between the adjacent unsintered first base conductor film patterns CLP, after which it is dried and then ground down or otherwise the unnecessary parts of the dried ceramic slurry CS are eliminated, to form an unsintered supplementary dielectric layer pattern DLP whose surface SU is roughly flush with the surfaces of the unsintered first base conductor film patterns CLP.

Figure 6B:
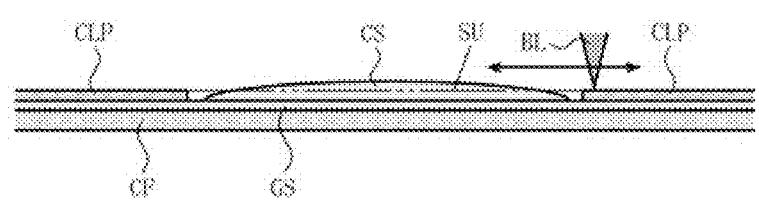

The method shown in FIG. 6B is one whereby the ceramic slurry CS is supplied between the adjacent unsintered first base conductor film patterns CLP by means of a dispenser, etc., in a manner thicker than the thickness of the unsintered first base conductor film patterns CLP, after which a blade BL, etc., is used to level the supplied ceramic slurry CS to make its surface SU roughly flush with the surfaces of the unsintered first base conductor film patterns CLP, and then this ceramic slurry CS is dried to form an unsintered supplementary dielectric layer pattern DLP.

Figure 6C:
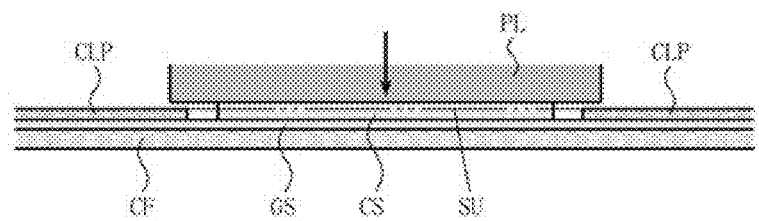

The method shown in FIG. 6C is one whereby the ceramic slurry CS is printed between the adjacent unsintered first base conductor film patterns CLP by means of screen printing, etc., in a manner thicker than the thickness of the unsintered first base conductor film patterns CLP and also narrower than the spacing between the adjacent unsintered first base conductor film patterns CLP, after which a plate PL, etc., is used to spread the printed ceramic slurry CS to make its surface SU roughly flush with the surfaces of the unsintered first base conductor film patterns CLP, and then this ceramic slurry CS is dried to form an unsintered supplementary dielectric layer pattern DLP.

Figure 7:
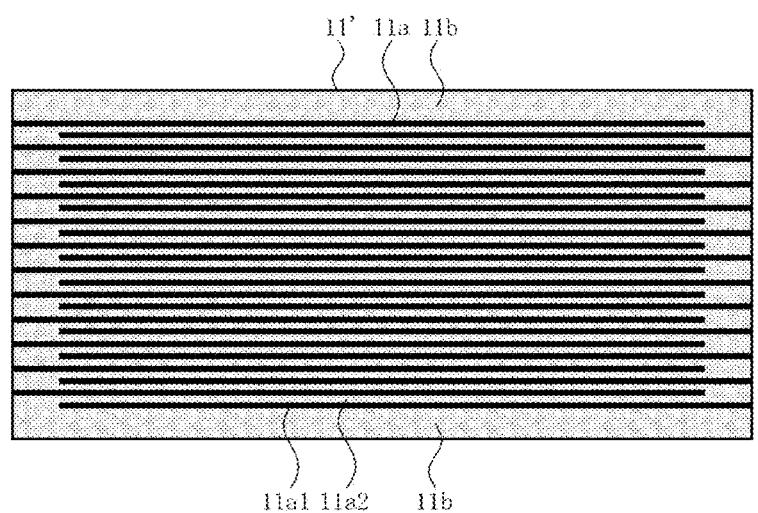
FIG. 7 is a drawing corresponding to FIG. 3, explaining an example of how the multilayer ceramic capacitor shown in FIGS. 1 to 4 is manufactured.

After the first sheet, second sheet and third sheet have been produced, a specified number of unit sheets that have been taken from the green sheet of the first sheet are stacked and thermally compressed together one by one, to form a part corresponding to the dielectric margin part 11b in one height direction. Next, a specified number of unit sheets (including the unsintered internal electrode layer patterns) that have been taken from the green sheet of the second sheet are stacked and thermally compressed together one by one, to form a part corresponding to the capacitive part 11a. Next, a specified number of unit sheets that have been taken from the green sheet of the first sheet are stacked and thermally compressed together one by one, to form a part corresponding to the dielectric margin part 11b in the other height direction. Lastly, all of the parts are thermally compressed together to produce an unsintered first multilayer sheet (refer to FIG. 7). It should be noted that, while FIG. 7 depicts an unsintered first multilayer sheet corresponding to one multilayer ceramic capacitor 10, for the purpose of illustration, the actual unsintered first multilayer sheet has a size that allows multiple multilayer ceramic capacitors 10 to be taken from it.

Figure 8:
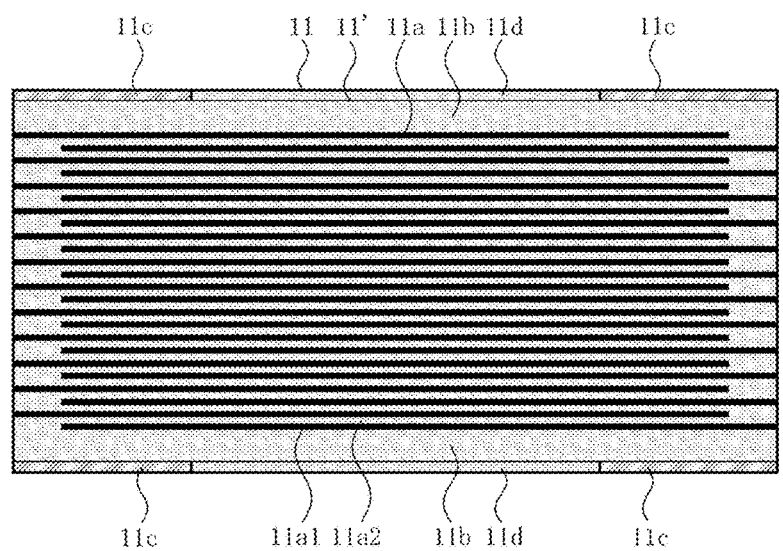
FIG. 8 is a drawing corresponding to FIG. 3, explaining an example of how the multilayer ceramic capacitor shown in FIGS. 1 to 4 is manufactured.

Next, a unit sheet (including the unsintered first base conductor film patterns and unsintered supplementary dielectric layer patterns) that has been taken from the green sheet of the third sheet is stacked on each of both height-direction faces of the first multilayer sheet and thermally compressed together, after which the entire sheets are thermally compressed together, if necessary, to produce an unsintered second multilayer sheet (refer to FIG. 8). It should be noted that, while FIG. 8 depicts an unsintered second multilayer sheet corresponding to one multilayer ceramic capacitor 10, for the purpose of illustration, the actual unsintered second multilayer sheet has a size that allows multiple multilayer ceramic capacitors 10 to be taken from it.

Next, the unsintered second multilayer sheet having a size that allows multiple multilayer ceramic capacitors 10 to be taken from it, is cut into a grid to produce unsintered capacitor bodies, each corresponding to a capacitor body 11 (refer to FIG. 8). Next, the second electrode paste is applied onto both length-direction faces of the unsintered capacitor body, by means of dip coating, roller coating, etc., and then dried, to produce unsintered second base conductor films corresponding to each of the second base conductor films 12a and 13a (refer to FIG. 9).

Figure 9:
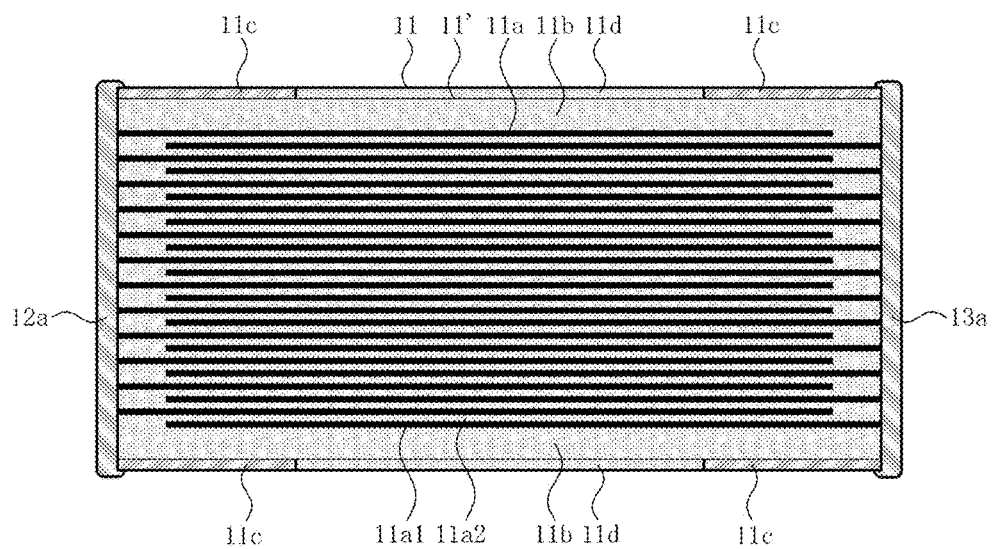
FIG. 9 is a drawing corresponding to FIG. 3, explaining an example of how the multilayer ceramic capacitor shown in FIGS. 1 to 4 is manufactured.

Next, the unsintered capacitor body having unsintered second base conductor films are put in a sintering oven and sintered (including a binder removal process and a sintering process) all at once in a reducing ambience according to a temperature profile appropriate for barium titanate and nickel, to produce a capacitor body 11 having second base conductor films 12a and 13a (refer to FIG. 9).

Figure 10:
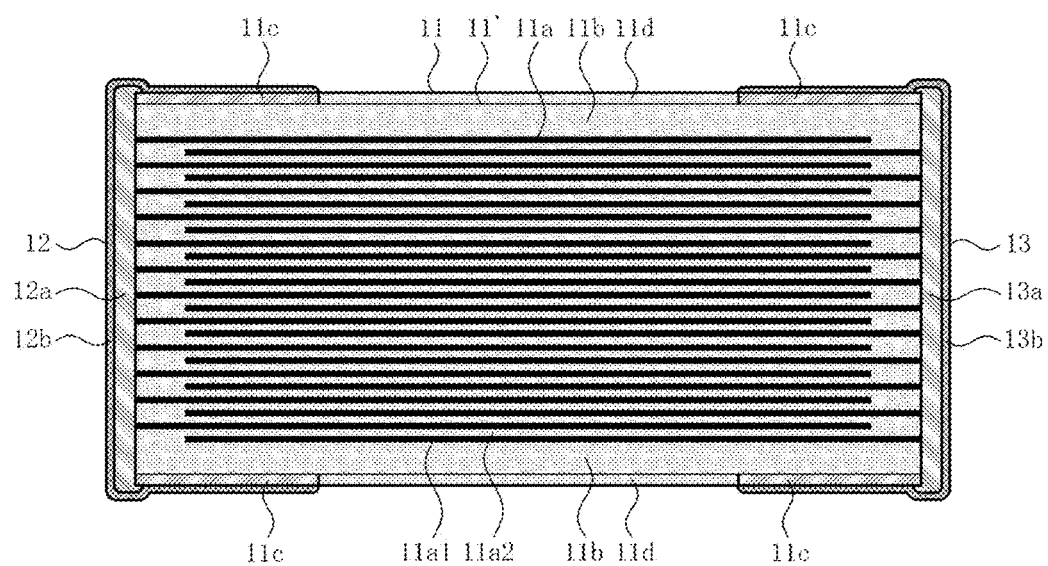
FIG. 10 is a drawing corresponding to FIG. 3, explaining an example of how the multilayer ceramic capacitor shown in FIGS. 1 to 4 is manufactured.

Next, electroplating, etc., is used to produce surface conductor films 12b and 13b that are each continuously attached to the surface of each second base conductor film 12a or 13a and to the surface of each first base conductor film 11c (refer to FIG. 10).

It should be noted that each of the second base conductor films 12a and 13a may be produced by producing a capacitor body 11 by sintering the aforementioned unsintered capacitor body (refer to FIG. 8) in the same manner as described above, and applying the second electrode paste on both length-direction faces of the capacitor body 11, and then drying and baking the paste.

Next, the structures of other multilayer ceramic capacitors to which the present invention is applied are explained.

Figure 11:
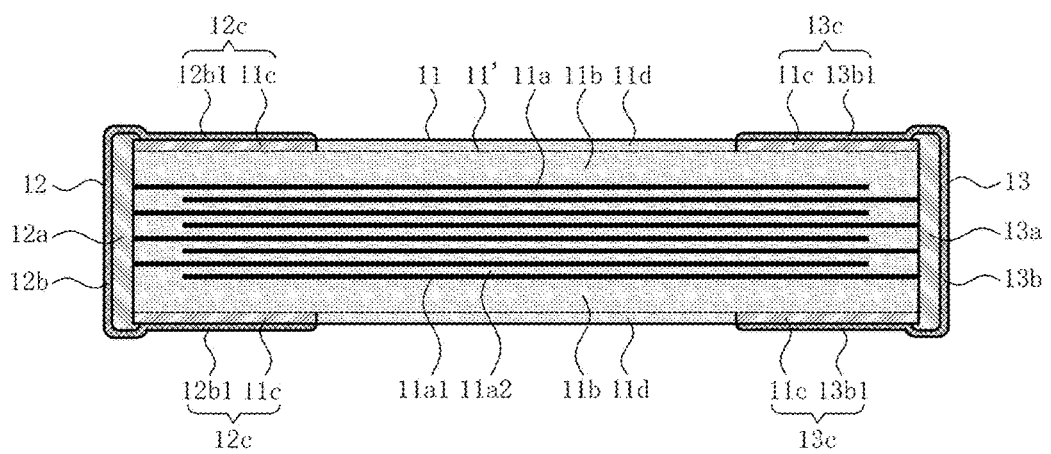
FIG. 11 is a drawing corresponding to FIG. 3, showing another multilayer ceramic capacitor to which the present invention is applied.

The multilayer ceramic capacitor shown in FIG. 11 has a height H corresponding to one-half the height H of the multilayer ceramic capacitor shown in FIGS. 1 to 4. For reference, the actual dimensions of length L, width W, and height H of the prototype on which FIG. 11 is based, are 600 µm, 300 µm, and 150 µm, respectively, where the relationship of "Length L>Width W>Height H" holds. The value of height H (150 µm) shown here is only an example, and the value of height H is not limited in any way so long as it is smaller than the width W of the multilayer ceramic capacitor 10. It should be noted that, although the second base conductor films 12a and 13a of the respective external electrodes 12 and 13 as depicted in FIG. 11 are such that their height-direction edges are both riding slightly over the respective first base conductor films 11c, in the same manner as in FIGS. 1 to 3, these ride-over parts are not necessary, or the lengths of the ride-over parts may be slightly larger than the lengths shown in the figure.

Figure 12:
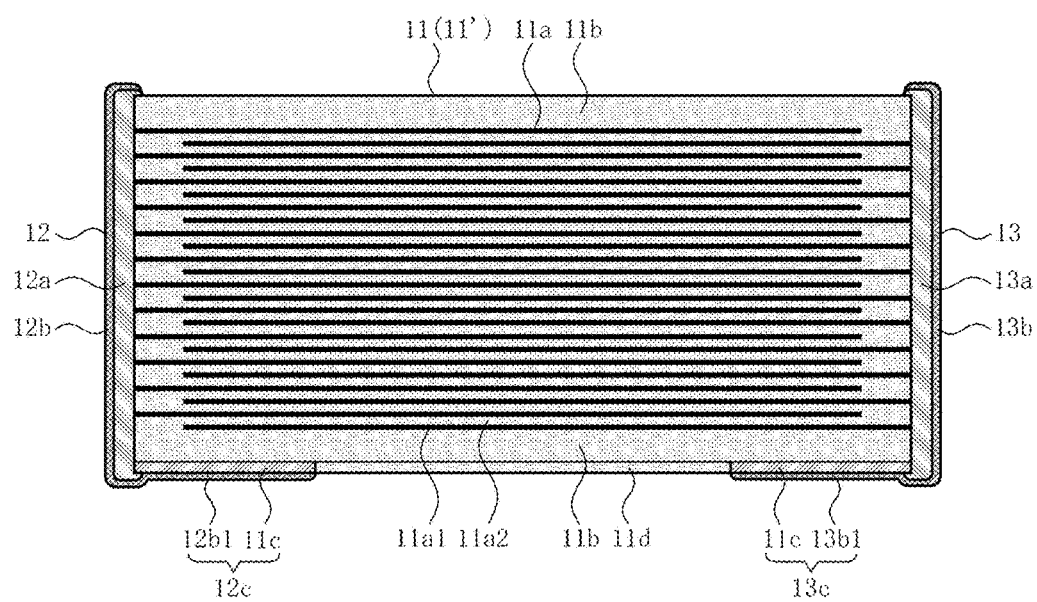
FIG. 12 is a drawing corresponding to FIG. 3, showing yet another multilayer ceramic capacitor to which the present invention is applied.

The multilayer ceramic capacitor shown in FIG. 12 does not have the two first base conductor films 11c and supplementary dielectric layer 11d present on the other height-direction face (top face in FIG. 3) of the capacitor body 11 of the multilayer ceramic capacitor 10 shown in FIGS. 1 to 4, and accordingly the surface conductor films 12b and 13b of the respective external electrodes 12 and 13 do not have the wrap-around locations 12b1 and 13b1 on the other height-direction face side, either. In other words, each external electrode 12 and 13 of the multilayer ceramic capacitor shown in FIG. 12 has one wrap-around part 12c and 13c where it wraps around only onto one height-direction face (bottom face in FIG. 12) of the capacitor body 11. The mode of each external electrode 12 and 13 shown here can also be applied to the multilayer ceramic capacitor explained using FIG. 11, whose height H is small. It should be noted that, although the second base conductor films 12a and 13a of the respective external electrodes 12 and 13 as depicted in FIG. 12 are such that their height-direction edges are both riding slightly over each first base conductor film 11c and the other height-direction face (top face in FIG. 12) of the capacitor body 11, in the same manner as in FIGS. 1 to 3, these ride-over parts are not necessary, or the lengths of the ride-over parts may be slightly larger than the lengths shown in the figure.

Also, although not illustrated, a third base conductor film may be provided, in a manner continuing to each first base conductor film 11c, on each of both width-direction sides of the capacitor body 11 of the multilayer ceramic capacitor 10 shown in FIGS. 1 to 4, with the surface conductor films (12b and 13b) provided in a manner also attaching to the surface of each third base conductor film, so as to constitute each external electrode (12 and 13) as having a total of four wrap-around parts where it wraps around not only onto both height-direction faces, but also onto both width-direction faces, of the capacitor body 11.

Furthermore, while FIGS. 1 to 4, 11, and 12 each illustrate a multilayer ceramic capacitor based on a prototype whose length L is 600 µm and width W is 300 µm, the values of length L and width W may be other than the foregoing. Additionally, while FIGS. 1 to 4, 11, and 12 each illustrate a multilayer ceramic capacitor having the relationship of "Length L>Width W=Height H" or "Length L>Width W>Height H," the relationship of length L, width W, and height H may be "L>H>W," "W>L=H," "W>L>H" or "W>H>L."

Next, the effects achieved by the multilayer ceramic capacitor 10 shown in FIGS. 1 to 4 are explained. The effects explained here can also be achieved in the same manner with the other multilayer ceramic capacitors described above.

[Effect 1] The two first base conductor films 11c and supplementary dielectric layer 11d on at least one height-direction face of the capacitive element 11' are connected to each other based on mutual bonding of the dielectric particles DP (refer to FIG. 4) contained in each of them. Accordingly, even when a force that would cause the capacitor body 11 to warp in the height direction is applied to the multilayer ceramic capacitor 10, gaps that continue to the capacitive element 11' do not form between the two first base conductor films 11c and the supplementary dielectric layer 11d. This means that, even when the height of the capacitive element 11' becomes smaller, the lack of strength of the capacitive element 11' can be compensated for in a reliable manner by the supplementary dielectric layer 11d provided between the two first base conductor films 11c.

In addition, the two first base conductor films 11c on at least one height-direction face of the capacitive element 11', and the capacitive element 11', are connected to each other based on mutual bonding of the dielectric particles contained in each of them, while the supplementary dielectric layer 11d on at least one height-direction face of the capacitive element 11', and the capacitive element 11', are connected to each other based on mutual bonding of the dielectric particles contained in each of them. Accordingly, even when a force that would cause the capacitor body 11 to warp in the height direction is applied to the multilayer ceramic capacitor 10, the separation of each of the two first base conductor films 11c and supplementary dielectric layer 11d from the capacitive element 11' can also be prevented in a reliable manner, and based on all of these, the aforementioned lack of strength can be compensated for in a more reliable manner.

[Effect 2] Since the "mutual bonding of dielectric particles" mentioned above represents particle bonding based on sintering, high strength is ensured for the connection between the two first base conductor films 11c and the supplementary dielectric layer 11d, for the connection between the two first base conductor films 11c and the capacitive element 11', and also for the connection between the supplementary dielectric layer 11d and the capacitive element 11', so that the aforementioned lack of strength can be compensated for in a more reliable manner.

[Effect 3] Since the width of each of the two first base conductor films 11c and that of the supplementary dielectric layer 11d are both roughly the same as the width of the capacitive element 11', the connection between the two first base conductor films 11c and the supplementary dielectric layer 11d can be achieved in an appropriate manner over as wide an area as possible, even when the thickness ta of each of the two first base conductor films 11c, and the thickness tb of the supplementary dielectric layer 11d, are small. In addition, the connection between the two first base conductor films 11c and the capacitive element 11', and the connection between the supplementary dielectric layer 11d and the capacitive element 11', can also be achieved in an appropriate manner over a wide area.

[Effect 4] Since the thickness ta of each of the two first base conductor films 11c is roughly the same as the thickness tb of the supplementary dielectric layer 11d, and the thickness tb of the supplementary dielectric layer 11d is smaller than the thickness of the wrap-around part 12c and 13c of each external electrode 12 and 13 (corresponding to ta+td), the supplementary dielectric layer 11d does not become an obstruction when the multilayer ceramic capacitor 10 is mounted on a circuit board or housed in a component-integrated board.

[Effect 5] Since the length La of the first base conductor film 11c constituting the wrap-around part 12c and 13c of each external electrode 12 and 13 is set in a range of one-sixth to three-sevenths the length L of the multilayer ceramic capacitor 10, sufficient connection area can be ensured at the wrap-around part 12c and 13c of each external electrode 12 and 13 when the multilayer ceramic capacitor 10 is mounted on a circuit board or housed in a component-integrated board.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-179228, filed Sep. 14, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor comprising a capacitor body of roughly rectangular solid shape, as well as a pair of external electrodes provided on both length-direction ends of the capacitor body, with the external electrodes each having wrap-around parts where it wraps around at least onto one height-direction face of the capacitor body:
   wherein the capacitor body has:
   (a1) a capacitive element of roughly rectangular solid shape which has a capacitive part constituted by multiple internal electrode layers stacked together with dielectric layers in between;
   (a2) first base conductor films provided on both length-direction ends of at least one height-direction face of the capacitive element; and
   (a3) a supplementary dielectric layer provided between the two first base conductor films on the at least one height-direction face of the capacitive element;
   where (a4) the two first base conductor films, and the supplementary dielectric layer, on at the least one height-direction face of the capacitive element, are connected to each other based on mutual bonding of dielectric particles contained in each of them;

(a5) the two first base conductor films on the at least one height-direction face of the capacitive element, and the capacitive element, are connected to each other based on mutual bonding of dielectric particles contained in each of them; and (a6) the supplementary dielectric layer on the at least one height-direction face of the capacitive element, and the capacitive element, are connected to each other based on mutual bonding of dielectric particles contained in each of them;

wherein one of the external electrodes has:

(b1) a second base conductor film attached to one length-direction face of the capacitive element, and also to one length-direction edge of the first base conductor film present on the at least one height-direction face on the one length-direction face side of the capacitor body; and (b2) a surface conductor film continuously attached to the surface of the second base conductor film and to a surface of the first base conductor film;

where (b3) the first base conductor film, and a wrap-around location of the surface conductor film where the surface conductor film is attached to the first base conductor film, together constitute the wrap-around part on the one length-direction face side; and wherein another of the external electrodes has:

(c1) a second base conductor film attached to another length-direction face of the capacitive element, and also to another length-direction edge of the first base conductor film present on the at least one height-direction face on the other length-direction face side of the capacitor body; and (c2) a surface conductor film continuously attached to the surface of the second base conductor film and to a surface of the first base conductor film;

where (c3) the first base conductor films, and a wrap-around location of the surface conductor film where the surface conductor film is attached to the first base conductor film, together constitute the wrap-around part on the other length-direction face side.

2. A multilayer ceramic capacitor according to claim 1, wherein the mutual bonding of the dielectric particles is sintering-based particle bonding or adhesion.

3. A multilayer ceramic capacitor according to claim 1, wherein a width of each of the first base conductor films and that of the supplementary dielectric layer are both roughly same as a width of the capacitive element.

4. A multilayer ceramic capacitor according to claim 1, wherein a thickness of each of the first base conductor films is roughly same as a thickness of the supplementary dielectric layer, and a thickness of the supplementary dielectric layer is smaller than a thickness of the wrap-around part of each of the external electrodes.

5. A multilayer ceramic capacitor according to claim 1, wherein a length of each of the first base conductor films is set in a range of one-sixth to three-sevenths a length of the multilayer ceramic capacitor.

6. A multilayer ceramic capacitor according to claim 1, wherein the external electrodes each have two wrap-around parts where it wraps around onto both height-direction faces of the capacitor body.

* * * * *